Feb. 19, 1929.  1,702,436
W. J. HEALEY
BATTERY LEVEL INDICATOR
Filed Dec. 7, 1921
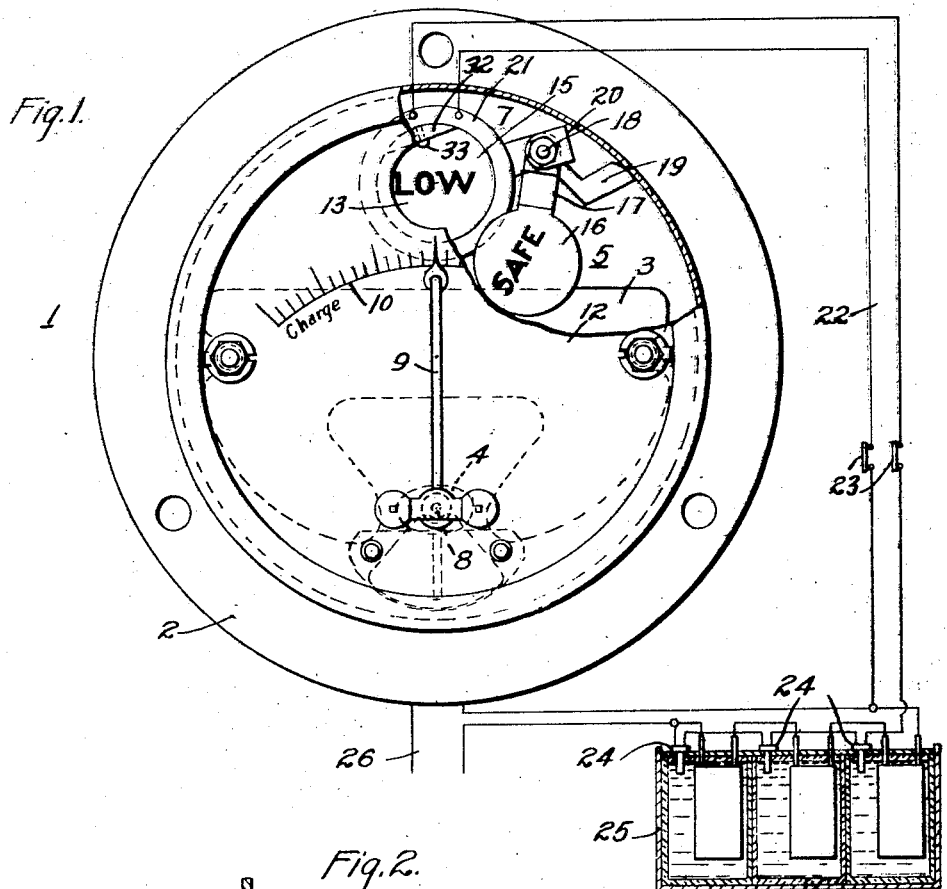
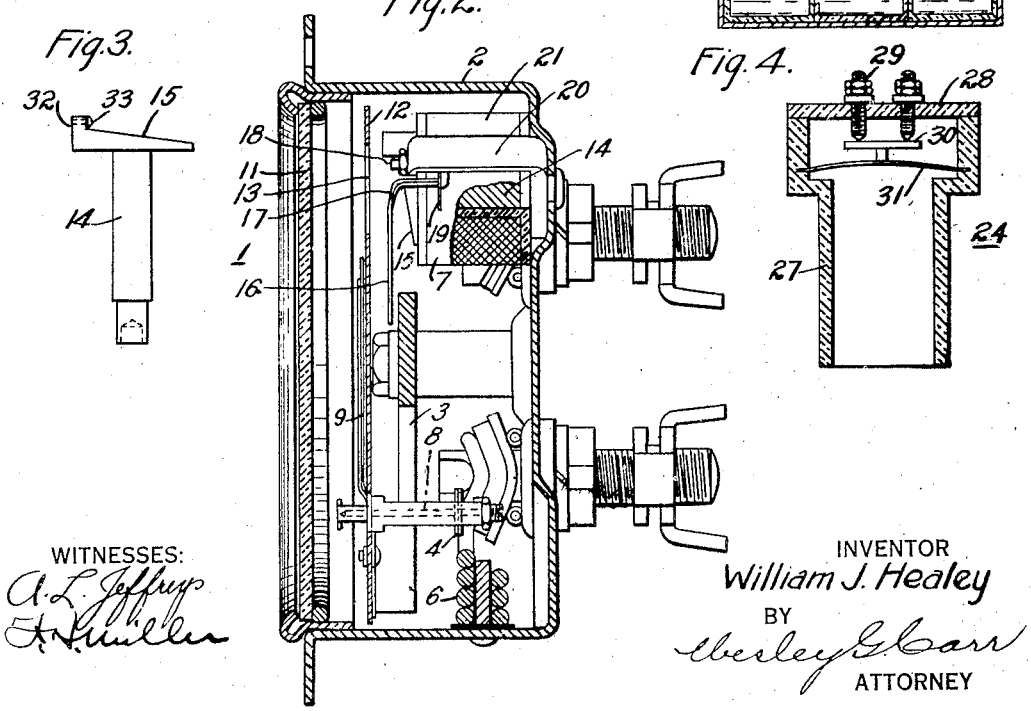
WITNESSES:
INVENTOR
William J. Healey
BY
ATTORNEY Patented Feb. 19, 1929.

1,702,436

UNITED STATES PATENT OFFICE.

WILLIAM J. HEALEY, OF WILKINSBURG, PENNSYLVANIA, ASSIGNOR TO WESTINGHOUSE ELECTRIC & MANUFACTURING COMPANY, A CORPORATION OF PENNSYLVANIA.

BATTERY-LEVEL INDICATOR.

Application filed December 7, 1921. Serial No. 520,611.

My invention relates to electrical instruments and particularly to instruments for indicating the levels of the electrolytes in electric batteries and other similar devices.

One object of my invention is to provide a device of the above-indicated character that shall be so simple and compact in construction as to readily permit it to be mounted in an ammeter or voltmeter casing without materially changing the construction or size of the casing as the latter would be constructed to receive the ammeter or voltmeter.

Another object of my invention is to provide a combination ammeter and battery-level indicator that shall be effective in operation and economical in manufacture.

In practicing my invention I provide, in combination with a usual type of automobile storage battery, a combination ammeter and battery-level indicator enclosed in a single casing. A constantly-energizing actuating electromagnet for the indicator embodies a single coil only that is so connected in series relation to the battery cells as to have its circuit interrupted and to thereby give an indication of the fact when the electrolyte level in any of the battery cells attains a dangerously low level.

Figure 1 of the accompanying drawings is a diagrammatic view of a system in which my invention is employed, illustrating a front view of the instrument with parts removed to show the interior mechanism.

Fig. 2 is a side view, partially in elevation and partially in section, of the instrument shown in Fig. 1.

Fig. 3 is a detail view of an electromagnet core member embodied in my invention, and Fig. 4 is a detail sectional view of a switch or contact-breaking device that is responsive to changes in the electrolyte level in the battery cells for actuating the indicator.

An instrument 1 comprises a supporting casing 2, in which a permanent magnet 3, movable magnetizable members 4 and 5 and electromagnets 6 and 7 are disposed.

The member 4 is mounted on a shaft 8, on which a pointer 9 is mounted for co-operation with a scale 10. The member 4 is so biased by the permanent magnet 3 as to cause the pointer 9 to be normally held at zero position and is actuated against the influence of the magnet 3 by the electromagnet 6 which may be connected to a circuit to be measured and energized in proportion to amperes or volts.

The instrument 2 is provided with a transparent cover plate 11 and a wall 12, in which a window 13 is provided.

The electromagnet 7 comprises a cylindrical core member 14 disposed behind the wall 12, at right angles thereto, and having a front-end portion 15 disposed adjacent to the window 13.

The movable magnetizable member 5 is constructed in the form of a semaphore signal and comprises a discoidal portion 16 and an arm 17 that is pivoted to a pin 18 and provided with a counter-balance weight 19. The arm 17 may be mounted in any suitable manner, such as upon a stationary bracket or arm 20 supported on the casing 2. The portion 16 is adapted to move in a plane at right angles to the core member 14 to and from a position between the front end 15 of the core member and the window 13.

A single coil 21, mounted on the core member 14 is connected, through an auxiliary circuit 22 having a switch 23 therein and through series-connected circuit interrupting devices 24, disposed one in each battery cell, to the terminals of a three-cell battery 25 that are connected, through the ammeter electromagnet 6, to a main circuit 26.

The devices 24 may each comprise a tubular shell 27, closed, at its upper end, by a wall 28 that supports stationary contact members 29, having a movable bridging contact member 30 mounted on a membrane or diaphragm 31 therein. When immersed in the battery electrolyte, the air in the lower part of the shells 27 is compressed to hold the diaphragms 31 in an upwardly distended position to thus close the circuit of the magnet coil 21.

When the electrolyte level in one or more of the battery cells falls below the lower ends of the shells 27, the air in the latter is released, the diaphragm 31 is lowered and the circuit of the coil 21 is broken. The disk 16 is moved by the weight 19 to expose the end 15 of the core member 14 through the window 13. The end 15 is suitably marked to indicate that the electrolyte in one or more of the battery cells has fallen to a dangerous level.

Since the semaphore disk 16 is relatively thin, as compared with the core member 14, the former would ordinarily become magnetically saturated and take up a position at its final attracted position of rest, off center with respect to the core member 14, if the end surface of the latter were disposed in a flat plane normal to the longitudinal axis of the electromagnet. The end portion 15 of the latter is, therefore, tapered, as shown, to compensate for the above-mentioned occurrence and to thus permit the disk 16 to become centered with respect to the core member. An offset portion 32 on the end portion 15 is provided with a non-magnetic stop member 33 to prevent the disk 16 from freezing in its upper or attracted position.

The parts of the battery-level indicator and its circuit are of such simple construction and arrangement as to provide a very compact, effective and economical device that is readily combined with a voltmeter or ammeter, without materially changing the latter, as it would exist if not so combined. Hence, a desirable addition to the cowl of an automobile, or other device, may be effected without the addition of further separate apparatus.

While I have shown and described a particular form of my invention, changes may be effected therein without departing from the spirit and scope thereof, as set forth in the appended claims.

I claim as my invention:

1. An indicating device comprising an electromagnet including a core member and an armature pivotally mounted to move to a predetermined position with respect to the axis of the core member and substantially at right angles with respect thereto, said armature being thin as though it were made of sheet metal, and said core member comprising a pole end shaped to prevent magnetic saturation of said armature during passage thereof to said position.

2. An indicating device comprising an electromagnet including a core member and an armature pivotally mounted to move to a predetermined position with respect to the axis of the core member and substantially at right angles with respect thereto, said armature being thin as though it were made of sheet metal, and said core member comprising a pole-end portion inclined with respect to the plane of said armature for preventing magnetic saturation thereof while passing to said position.

In testimony whereof, I have hereunto subscribed my name this 28th day of November, 1921.

WILLIAM J. HEALEY.